Figure 1:
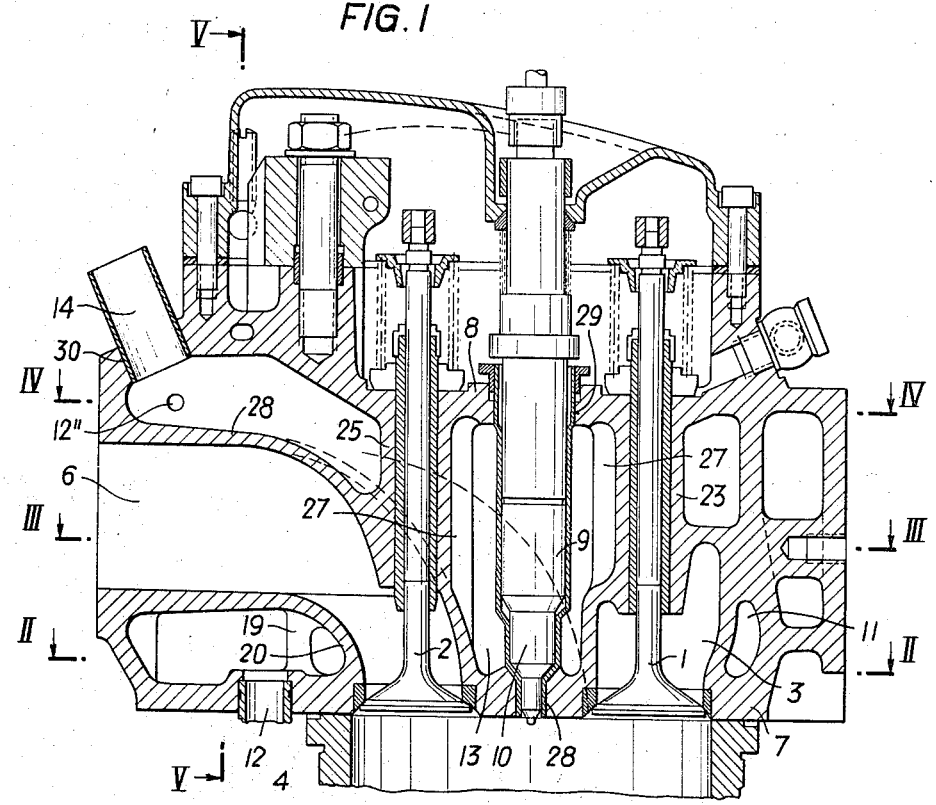

United States Patent
Feichtinger et al.

[11] 3,769,948
[45] Nov. 6, 1973

[54] CYLINDER HEAD FOR A WATER-COOLED INTERNAL COMBUSTION ENGINE

[75] Inventors: Gerhard Feichtinger; Othmar Skatsche, both of Graz, Austria

[73] Assignee: Hans List, Graz, Austria

[22] Filed: Aug. 2, 1972

[21] Appl. No.: 277,288

[30] Foreign Application Priority Data
Aug. 3, 1971   Austria..................................... 6786

[52] U.S. Cl......... 123/41.31, 123/41.77, 123/41.82, 123/41.85, 123/188 M
[51] Int. Cl. ......... F02f 1/38, F01p 3/02, F01p 3/12
[58] Field of Search .................... 123/188 M, 41.77, 123/41.82, 41.85, 41.31, 41.32

[56] References Cited
UNITED STATES PATENTS

| | | | |
|---|---|---|---|
| 2,619,078 | 11/1952 | Witzky et al.............. | 123/41.77 UX |
| 2,710,602 | 6/1955 | Maybach ..................... | 123/41.82 X |
| 2,736,300 | 2/1956 | Flynn, Jr...................... | 123/41.31 |
| 2,739,579 | 3/1956 | Ware et al. ..................... | 123/41.31 |
| 3,045,655 | 7/1962 | Formia....................... | 123/188 M X |
| 3,081,755 | 3/1963 | Kotlin et al. ..................... | 123/41.77 |
| 3,315,652 | 4/1967 | Ries et al..................... | 123/41.82 X |
| 3,353,522 | 11/1967 | Ley............................. | 123/41.77 X |
| 3,420,215 | 1/1969 | Seifert.......................... | 123/41.82 X |
| 3,491,731 | 1/1970 | Dinger et al. ..................... | 123/41.82 |
| 3,590,789 | 7/1971 | Wiebicke et al. .......... | 123/188 M X |

FOREIGN PATENTS OR APPLICATIONS

| | | | |
|---|---|---|---|
| 2,017,877 | 11/1970 | Germany......................... | 123/188 M |
| 724,461 | 2/1955 | Great Britain .................... | 123/41.82 |
| 828,014 | 2/1960 | Great Britain .................... | 123/41.82 |

*Primary Examiner*—Al Lawrence Smith
*Attorney*—Watson, Cole, Grindle & Watson

[57] ABSTRACT

A cylinder-head for an internal combustion engine with two suspended intake and exhaust valves for each cylinder, two exhaust valve ducts merging into a common exhaust valve port, a first cooling-water chamber forming an annular chamber surrounding the intake and exhaust valves and having a cooling-water outlet, a second cooling-water chamber extending centrally between the valves in an upward direction and communicating with the first cooling-water chamber by means of radial ducts extending through the webs between adjoining valves, the second cooling-water chamber terminating as a duct extending above the common exhaust port as far as a cooling-water outlet of the cylinder-head.

5 Claims, 6 Drawing Figures

PATENTED NOV 6 1973

3,769,948

SHEET 1 OF 3

CYLINDER HEAD FOR A WATER-COOLED INTERNAL COMBUSTION ENGINE

The invention relates to a cylinder head for a water-cooled internal combustion engine comprising two inverted intake valves and two inverted exhaust valves, each of the intake and exhaust valves respectively being arranged diametrically opposite the other in relation to the cylinder axis, and exhaust valve ducts merging into a common exhaust passage, and further comprising two cooling-water chambers, the first of which is connected via an inlet orifice in the cylinder-head bottom to the cooling-water chamber of the cylinder and communicates with the second cooling-water chamber via radial ducts extending through the webs between the valves.

This known cylinder-head design provides improved cooling conditions in the area of the valve seats and valve guides so as to protect these members from an excessive thermal load. A drawback of the conventional cylinder-head design resides, however, in the fact, that the cooling-water flows from the inlet port in the cylinder-head bottom initially upwards into a first cooling-water chamber, watering the injection nozzle located in the middle between the valves, whereupon it flows down again to the radial cooling passages in the web areas between the valves. In the process, the cooling-water on its way to the web areas in the first cooling-water chamber absorbs a considerable amount of heat to the detriment of the effectiveness of the cooling of the web area which is subject to a particularly high thermal load and particularly liable to produce heat cracks. Besides, according to the known design the cooling requirements of the exhaust port walls, especially in the area where the two exhaust port passages merge into a common exhaust duct, are met to an inadequate extent only. Consequently, intolerable deformations are liable to be produced in these areas of the port walls which are subject to particularly intense heat produced by the exhaust gases. Yet another shortcoming resides in the peculiar design of the cylinder-head entailing certain difficulties in the casting process due to troubles with core-mounting.

It is the purpose of the invention to provide a cylinder-head of the type hereabove described, avoiding the drawbacks of the known design and ensuring highly satisfactory cooling of such parts of the cylinder-head as a subject to a high thermal stress. At the same time, the necessities of economic serial production should be fully taken into account. According to the invention, the first cooling-water chamber is designed as an annular chamber surrounding the valve area including the guide bushings, into which the cooling-water flows through an aperture provided below the common exhaust duct, while the second cooling-water chamber comprises a section extending in an upward direction between the valves and their guide bushings, and an adjacent passage leading to the cooling-water outlet of the cylinder-head above the common exhaust duct. Due to this design of the cylinder-head the cooling-water emerging from the cooling-water chamber of the cylinder is forced to take the shortest route when flowing alongside the wall of the common exhaust duct to the radial passages extending through the valve webs. Consequently, cooling-water having a relatively low initial temperature is available in these areas which are subject to particularly high thermal stress. Since the first cooling-water chamber is of annular design, it is quite easy to split the cooling-water current up over the periphery of the annular chamber in such a manner that the individual cooling requirements of each of the four valve webs are well taken care off. For example, the web situated between the two exhaust valves requires much more effective cooling than does the opposite web between the two intake valves. Such a cooling system which takes the different cooling requirements of the valve webs duly into account is therefore, conducive to uniform wall temperatures in the valve area and in the cylinder-head bottom so that deformations and cracks due to excessive thermal stress in this part of the cylinder-head can be avoided.

The fact that the cooling-water in the second cooling-water chamber is directed over the upper partition of the common exhaust passage is to a considerable degree responsible for the maintenance of the ordinary wall temperatures of the exhaust duct, particularly where the two exhaust port passages merge into the common exhaust duct, within admissible limits.

Another advantage of the design according to the invention results from certain structural features devised to facilitate the casting process by the provision of an exceedingly simple support for the core required for the formation of the second cooling-water chamber and by the easy accessibility of the second cooling-water chamber for cleaning operations.

According to a preferred embodiment of the invention, one of the two exhaust valves is located opposite the overflow aperture of the first cooling-water chamber and the valve guide bushing of this exhaust valve extends through the second cooling-water chamber situated above the exhaust duct. This arrangement takes due account of the fact that one of the two exhaust valves, namely the one closest to the common exhaust duct, is subject to major thermal stress inasmuch as its temperature is further increased by the exhaust gases of the other exhaust valve. Due to the fact that this exhaust valve which is subject to a particularly high thermal load is arranged directly opposite the first overflow aperture of the cooling-water chamber, its greater cooling requirements are well taken care of. This arrangement of the guide bushing of this valve contributes towards increased cooling of same.

According to another embodiment of the invention, a further means of equalizing the wall temperatures in the proximity of the valve consists in the provision of different cross-sections of the radial ducts interconnecting the two cooling-water chambers as a function of the thermal load of the valve web concerned in such a manner that the duct located between the exhaust valves is given the largest cross-section.

According to a further embodiment of the invention, as applied to a cylinder head comprising an injection nozzle located in the middle between the valves, the injection nozzle in a nozzle holder sleeve extends through the upwards-leading section of the second cooling-water chamber. As a result, the injection nozzle is positively cooled by means of the cooling-water flowing in an upward direction alongside the outer surface of the nozzle-holder sleeve.

Finally, according to yet another embodiment of the invention, the valve guide bushing(s) may, on the side facing the cooling-water chamber, comprise one or a plurality of cooling ribs resulting in an additional improvement of the cooling effect.

Figure 2:
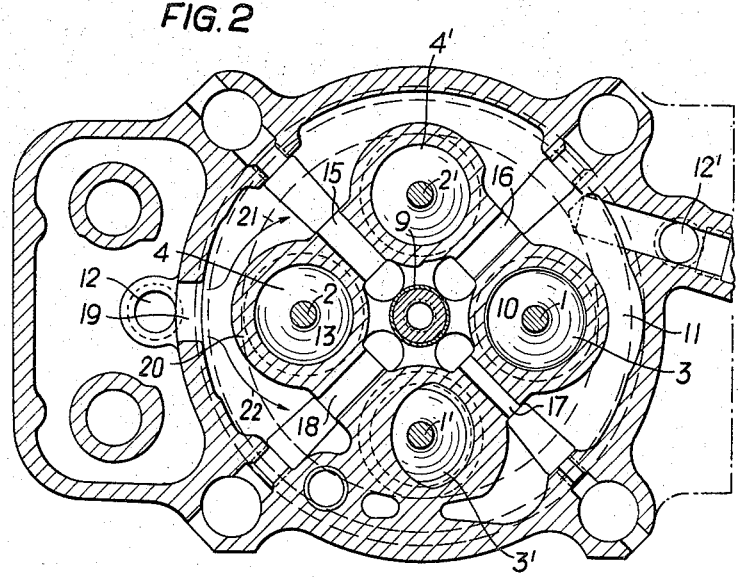
Figure 3:
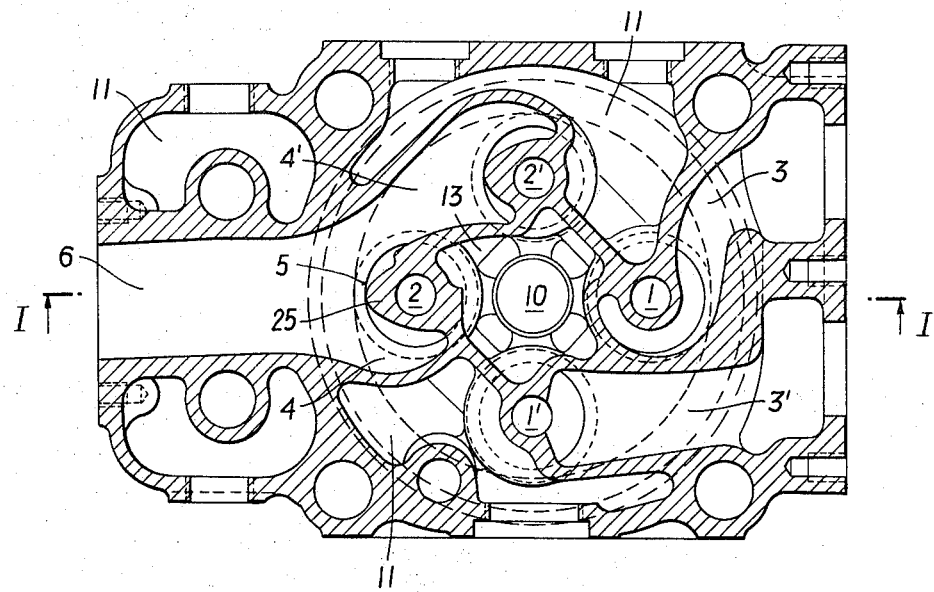
Figure 4:
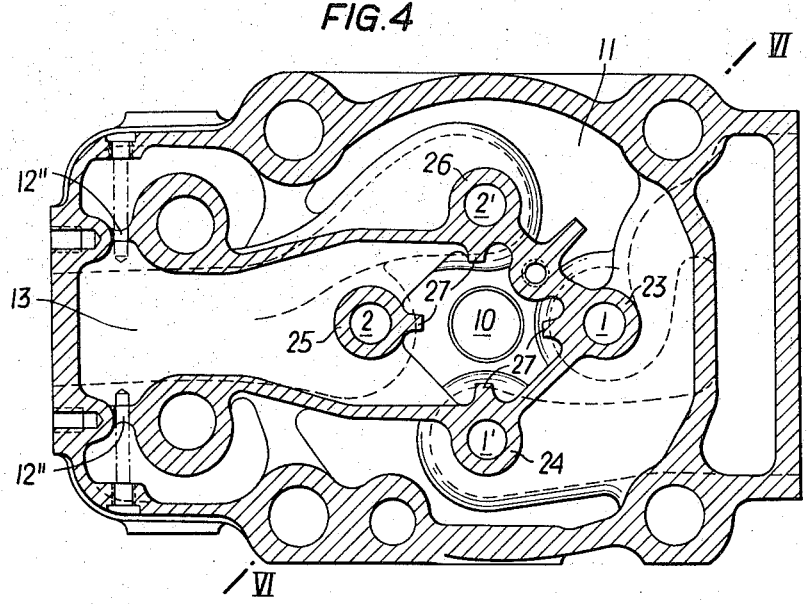
Figure 5:
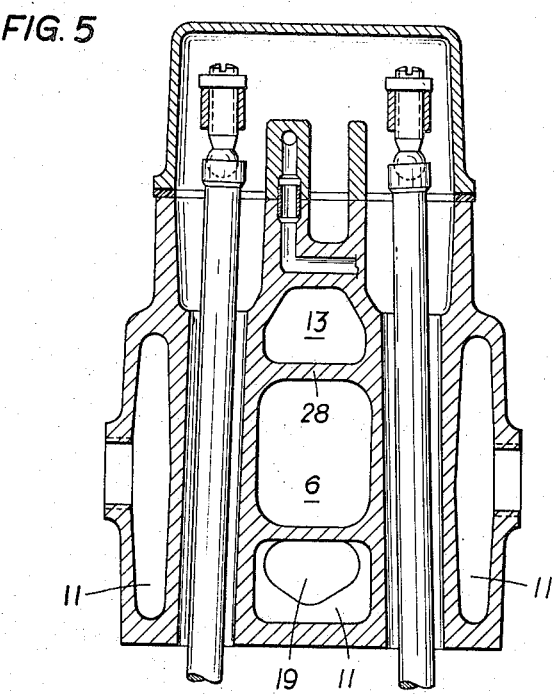
Figure 6:
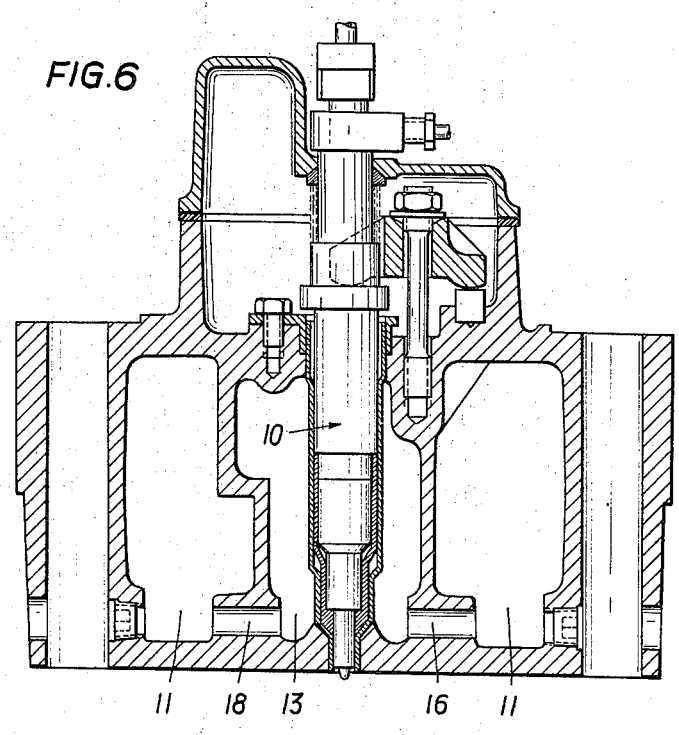

Further details of the invention will become apparent from the following description of a preferred embodiment of the invention with reference to the accompanying drawing wherein FIG. 1 is a vertical cross-sectional view of a cylinder-head according to the invention on line I—I of FIG. 3, FIG. 2 is a horizontal cross-sectional view of the cylinder-head on line II—II of FIG. 1, FIGS. 3 and 4 each show another horizontal cross-section on lines III—III and IV—IV respectively of FIG. 1, FIG. 5 is yet another cross-sectional view of the cylinder-head on line V—V of FIG. 1, and FIG. 6 is a normal sectional view of the cylinder-head on line VI—VI of FIG. 4.

The cylinder-head shown for a water-cooled fuel-injection-type internal combustion engine comprises two suspended intake valves 1,1' and two exhaust valves 2,2'. One intake valve and one exhaust valve each are diametrically opposite each other in relation to the cylinder axis. Separate inlet ducts 3,3' emerging from the same side of the cylinder-head, lead to the intake valves 1,1', the duct 3 being designed as a spiral duct and the duct 3' as an inclined duct.

From the exhaust valves 2,2' emerge valve ports 4,4' merging at 5 so as to form a common exhaust passage 6 terminating on the side of the cylinder-head opposite the intake ports 3,3'. (See in particular FIG. 3).

Tightly inserted in a bore which is coaxial in relation to the cylinder axis and extends through the cylinder-head bottom 7 and the upper boundary wall 8 of the cylinder-head is a nozzle-holder sleeve 9 inside which the injection nozzle 10 is located. The type of supporting means used is known per se and further particulars of the nozzle arrangement are immaterial for the understanding of the invention, and will not be explained here in any detail. Likewise, no further mention will be made of details of the drive in pairs, known per se, of the respective valves by means of pushrods, valve rockers and bridge.

Of major importance for the invention, however, is the particular design of the cooling-water-carrying chamber of the cylinder-head. This comprises essentially a first cooling-water chamber 11 designed as an annular chamber surrounding the valve area inclusive of guide bushings and connected via an inlet 12 in the cylinder-head bottom 7 and an additional water inlet 12' provided for the devaporization of the cylinder-liner water-chamber leading to the cooling-water chamber of the associated cylinder, and a second cooling-water chamber 13 consisting of a section extending in an upward direction between the valves 1,1', 2,2', and an adjoining duct leading above the exhaust port 6 to the cooling-water outlet 14 of the cylinder-head.

The two cooling-water chambers 11 and 13 communicate with each other on the one hand, via a total of four radial passages 15 thru 18 extending parallel to the cylinder-head bottom 7 through the webs between the valves. On the other hand, the cooling-water chambers 11 and 13 are also interconnected by means of two bores 12'' (FIG. 4) serving for the de-vaporization and ventilation of the cooling-water chamber 11. Depending on the thermal stress to which the associated valve webs are being subjected, the passages 15 thru 18 are of different diameters, the largest diameter being that of the passage 15 located between the two exhaust valves 2,2', and that of the opposite passage 17 extending between the intake valves 1,1', being the smallest. The traverse passages 16 and 18, however, are of the same cross-section which is approximately the mean value of the cross-sections of the passages 15 and 17.

The cooling-water emerging through the inlet 12 from the cooling-water chamber of the associated cylinder enters the annular portion of the first cooling-water chamber 11 via an overflow aperture 19 located below the exhaust port 6. As appears in particular from FIGS. 1 and 2, the cooling-water flows towards the wall 20 of the exhaust valve duct 4 directly opposite the aperture 19 and splits in front of same into two branch currents 21 and 22 of about equal size, flowing through the annular chamber 11 in respectively opposite directions. The cooling-water then flows through the radial passages 15 thru 18 in the web areas between the valves and passes into the upwardly directed section of the second cooling-water chamber 13. By appropriately dimensioning the cross-sectional areas of the radial passages as a function of the thermal stress to which the valve webs are exposed, the temperature of the cylinder-head bottom 7 is equalized in the proximity of the valves. The branch current of cooling-water entering the cooling-water chamber 11 through the aperture 12' improves the cooling of the walls of the exhaust duct 4'.

Now the cooling-water enters the second cooling-water chamber 13 and flows in an upward direction into the annular chamber formed between the valve guide bushings 23 thru 26 and the nozzle-holder sleeve 9. On its inner surface each of the valve guide bushings has a longitudinal rib 27 in order to increase the cooling effect of the cooling-water flowing in an upward direction alongside the bushings. The cooling-water now flows in two branch currents on both sides of the valve guide bushing 25 of the exhaust valve 2 subject to greater thermal stress, extending through the cooling-water chamber 13 into the laterally extending section of the second cooling-water chamber 13, watering the upper wall 28 of the exhaust duct 6, and emerging finally through the outlet 14 from the cylinder-head.

Consequently, this kind of cooling-water guidance not only ensures particularly effective cooling of the area of the cylinder-head comprising the two exhaust valves 2,2' and their ducts 4,4' but it also equalizes the thermal load in the web areas between the valves to a considerable extent. Therefore, a cylinder-head designed as hereabove described is particularly suitable for heavy-duty engines which are as a rule, subject to excessively high thermal stress.

The cylinder-head designed according to the invention also distinguishes itself by special features greatly facilitating the casting process. In fact, the core required for the formation of the second cooling-water chamber 13 can be supported in a simple manner in the places marked by reference numbers 28, 29 and 30 by means of chaplets. This simplifies the mounting of the core and provides convenient accessibility of the cooling-water chamber 13 for cleaning operations.

I claim:

1. In a cylinder-head of a water-cooled internal combustion engine having two suspended intake and exhaust valves for each cylinder, of which one intake and one exhaust valve are diametrically opposite each other in relation to the cylinder axis, guide bushings for said intake and exhaust valves, two exhaust valve ducts merging into a common exhaust port, two cooling-water chambers, the first of which communicates with a cooling-water chamber of the associated cylinder via an inlet provided in the bottom of the cylinder-head, the second cooling-water chamber communicating with the first cooling-water chamber through radial ducts extending through webs formed between said intake and exhaust valves, the combination of the following features:

- the first cooling-water chamber designed as an annular chamber surrounding said intake and exhaust valves together with said guide bushings;
- an overflow aperture provided in said first cooling-water chamber below said common exhaust port;
- said second cooling-water chamber comprising two sections;
- the first section of said second cooling-water chamber extending between said intake and exhaust valves and their guide bushings in an upward direction;
- the second section of said second cooling-water chamber adjoining said first section of same and designed as a duct extending above said common exhaust port as far as a cooling-water outlet of the cylinder-head.

2. A cylinder-head according to claim 1, wherein one of said exhaust valves is located opposite said overflow aperture leading into the first cooling-water chamber, and the guide bushing of this exhaust valve extends through the second cooling-water chamber located above the common exhaust port.

3. A cylinder-head according to claim 1, wherein said radial ducts connecting the first with the second cooling-water chamber have different cross-sections, the cross-sectional areas being sized as a function of the thermal stress affecting the associated valve web, the duct between the exhaust valves having the largest cross-sectional area of all ducts.

4. A cylinder-head according to claim 1, comprising an injection nozzle, a nozzle-holder sleeve including said injection nozzle, and located centrally between said intake and exhaust valves, and extending through said upwardly directed first section of said second cooling-water chamber.

5. A cylinder-head according to claim 1, comprising cooling ribs on said guide bushings of the intake and exhaust valves, said cooling ribs being located on the side of said guide bushings facing the second cooling-water chamber, and extending in the longitudinal direction of the guide bushings.

* * * * *